(12) United States Patent
Nishi et al.

(10) Patent No.: US 8,640,668 B2
(45) Date of Patent: Feb. 4, 2014

(54) BALANCER DEVICE OF ENGINE

(75) Inventors: Kunihiro Nishi, Hiroshima (JP);
Hisayuki Yamane, Hiroshima (JP);
Masanori Hashimoto, Hiroshima (JP);
Sakumi Haseto, Hiroshima (JP);
Masaaki Sato, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 316 days.

(21) Appl. No.: 13/116,858

(22) Filed: May 26, 2011

(65) Prior Publication Data

US 2011/0308492 A1 Dec. 22, 2011

(30) Foreign Application Priority Data

Jun. 21, 2010 (JP) .................................. 2010-140387
Apr. 18, 2011 (JP) .................................. 2011-092289

(51) Int. Cl.
*F02B 75/06* (2006.01)

(52) U.S. Cl.
USPC ........... 123/192.2; 123/192.1; 74/603; 74/605

(58) Field of Classification Search
USPC ...... 123/192.2, 192.1, 196 R, 198 C; 74/603, 74/604, 605
See application file for complete search history.

(56) References Cited

U.S. PATENT DOCUMENTS

| 4,425,821 | A | * | 1/1984 | West | 74/604 |
| 5,791,309 | A | * | 8/1998 | Yamazaki et al. | 123/192.2 |
| 5,918,573 | A | * | 7/1999 | Killion | 123/192.2 |
| 6,758,183 | B2 | * | 7/2004 | Endo et al. | 123/192.2 |
| 6,772,725 | B2 | * | 8/2004 | Inaba et al. | 123/192.2 |
| 7,367,293 | B2 | * | 5/2008 | Takeuchi | 123/41.57 |
| 7,478,618 | B2 | * | 1/2009 | Hashimoto et al. | 123/192.2 |
| 7,673,609 | B2 | * | 3/2010 | Inui et al. | 123/193.5 |
| 7,882,819 | B2 | * | 2/2011 | Koyama | 123/196 R |
| 7,905,212 | B2 | * | 3/2011 | Ohsawa | 123/196 R |

\* cited by examiner

*Primary Examiner* — Noah Kamen
*Assistant Examiner* — Grant Moubry
(74) *Attorney, Agent, or Firm* — Studebaker & Brackett PC (57) ABSTRACT

An oil pump unit comprises a pump shaft and a pump housing which stores the pump shaft. A balancer unit comprises a pair of balancer shafts and a balancer housing which stores the balancer shafts. The pump housing and the balancer housing are coupled to each other at least in the vicinity of a periphery of the pump shaft, and at a coupling portion in the vicinity of the periphery of a power transmission shaft is formed a connection groove which connects the inside to the inside of the coupling portion. Accordingly, it can be retrained that the reliability of journal portions of the balancer shaft of the balancer unit and the like is deteriorated by dusts and the like contained in high-pressure oil from the oil pump unit in a balancer device of an engine.

7 Claims, 8 Drawing Sheets

BALANCER DEVICE OF ENGINE

BACKGROUND OF THE INVENTION

The present invention relates to a balancer device of an engine which comprises an oil pump unit driven by a rotation of the engine and a balancer unit.

Such a balancer device of an engine equipped with an oil pump unit and a balancer unit which are coupled to each other and stored inside an oil pan of the engine is known as prior art.

A conventional balancer device disclosed in U.S. Pat. No. 7,905,212 will be described.

In the balancer device of the above-described patent document, this balancer unit comprises a pair of balancer shafts. These balancer shafts are driven by a rotation of the engine. The oil pump unit is driven by a rotation of the balancer shaft. The pump chamber of the oil pump unit is arranged on the side of one of the pair of balancer shafts which are located vehicle-rearward. The oil strainer is arranged in front of the shaft center of the other balancer shaft which is located vehicle-forward. The inlet chamber and the outlet chamber of the oil pump unit are positioned to overlap vertically on one side of the pump chamber in its peripheral direction and to extend linearly vehicle-forward from the pump chamber. Thereby, the inlet and outlet chambers of the oil pump unit which are respectively arranged in front and back of the pump rotor can provide a little-curved structure and a smaller layout space, so that both the discharge function of the oil pump unit and the installment function of the balancer device to the engine can be improved. Further, since the oil pump unit and the balancer unit are coupled to each other, the longitudinal length of the balancer device can be shortened and thereby the size of the balancer device can be properly small.

In case the oil pump unit and the balancer unit are coupled to each other like the device of the above-described patent document, there is a concern that when the oil with a high pressure flows into the balancer unit at the coupling portion from the side of the oil pump unit, the reliability of the balancer shafts may deteriorate. Specifically, the oil inside the oil pump unit does not flow down through any oil filter. Accordingly, dusts and the like (i.e., foreign matters) to damage the balancer shafts and the like may be contained in the flowing oil, so that the balancer shafts may be damaged.

SUMMARY OF THE INVENTION

The present invention has been devised in view of the above-described matter, and an object of the present invention is to provide a balancer device of an engine, in which the oil pump unit and the balancer unit are coupled to each other, which can retrain the reliability of the balancer shafts from deteriorating.

According to the present invention, there is provided a balancer device of an engine, comprising an oil pump unit including a pump shaft driven by a rotation of the engine, a rotor driven by the pump shaft to increase a pressure of oil, and a pump housing storing the rotor therein, a balancer unit including a pair of balancer shafts and a balancer housing storing the balancer shafts therein, and a power transmission shaft transmitting a drive force of the oil pump unit to the balancer unit, wherein the oil pump unit and the balancer unit are coupled to each other and stored inside an oil pan of the engine, the pump housing and the balancer housing are coupled to each other at least at a periphery of the power transmission shaft, and at a coupling portion of the pump hosing and the balancer housing is formed a connection portion which connects the inside to the inside of the coupling portion.

According to the present invention, since the connection portion connecting the inside to the inside of the coupling portion is formed at the coupling portion at the periphery of the power transmission shaft, even if the high-pressure oil containing dusts and the like from the oil pump unit flows into the balancer housing, this oil flows out to the outside of the coupling portion, passing through the connection portion, thereby to the outside of the balancer housing. Accordingly, the high-pressure oil can be restrained from flowing further into the balancer housing, so that it can be surely restrained that the dusts and the like contained in the high-pressure oil damage the balancer shafts of the balancer unit. Consequently, the reliability of the balancer shafts can be improved.

According to an embodiment of the present invention, the coupling portion includes a pump-side coupling face which is comprised of at least part of an outer surface of the pump housing and a balancer-side coupling face which is comprised of at least part of an outer surface of the balancer housing and coupled to the pump-side coupling face, and the connection portion comprises a connection groove which is formed at least at one of the two coupling faces. Thereby, since the connection groove as the connection portion is formed at least at one of the two coupling faces, the connection portion can be formed easily.

According to another embodiment of the present invention, the balancer housing comprises an upper housing and a lower housing which are coupled to each other, which are half-split articles of casting, and the connection groove is formed at the balancer-side coupling face to extend along a split-coupling face of the upper housing and the lower housing. Thereby, since the connection groove is formed at the balancer-side coupling face to extend along the split-coupling face of the upper housing and the lower housing, the connection groove as the connection portion can be formed easily with lower costs.

According to another embodiment of the present invention, the power transmission shaft extends from the pump shaft into the balancer housing, the balancer unit further comprises a multiplying gear mechanism which is stored inside the balancer housing on the side of the pump housing, transmits a rotation of the pump shaft which is transmitted via the power transmission shaft to one of the pair of balancer shafts with an increase of rotational speed, and includes a gear shaft which engages with the power transmission shaft inside the balancer housing and is driven by a rotation of the power transmission shaft, a journal hole for gear shaft to rotationally support the gear shaft is formed at an end portion of the balancer housing on the side of the pump housing, a journal hole for pump shaft to rotationally support the pump shaft is formed at an end portion of the pump housing on the side of the balancer housing, a peripheral portion of the journal hole for pump shaft of the pump housing and a peripheral portion of the journal hole for gear shaft of the balancer housing constitute the coupling portion, a cylindrical positioning pin is inserted into both the journal hole for pump shaft and the journal hole for gear shaft, and the connection portion is formed so that the connection portion opens at an inner peripheral face of at least one of the journal hole for pump shaft and the journal hole for gear shaft and at least part of an opening end thereof at the inner peripheral face is located on the outside of the positioning pin in an axial direction. Thereby, since the cylindrical positioning pin is inserted into both the journal hole for pump shaft of the pump housing and the journal hole for gear shaft of the balancer housing, the coaxial arrangement of the both journal holes, i.e., the pump shaft and the gear shaft, can be provided properly. Further, since the connection portion is formed so that at least part of its opening end at the inner peripheral face is located on the outside of the positioning pin in the axial direction, it can be restrained that the positioning pin obstructs the oil flowing out to the outside of the balancer housing passing through the connection portion. Thus, it can be surely restrained that the oil flows into the balancer housing.

According to another embodiment of the present invention, the connection portion opens at the inner peripheral face of the journal hole for gear shaft, the gear shaft is rotationally supported at the journal hole for gear shaft via a bearing inserted into the journal hole for gear shaft, and an oil supply passage to supply the oil from an outer peripheral side of the bearing to a space between the bearing and the gear shaft is formed at the balancer housing. Thereby, the space between the journal hole for gear shaft and the gear shaft can be lubricated by the oil supplied through the oil supply passage. Further, since the oil after lubricating is discharged to the outside of the balancer housing through the connection portion, it can be restrained that the oil improperly stays inside the balancer housing improperly to increase its temperature. Accordingly, it can be restrained that the high-temperature oil damages the power transmission shaft.

Other features, aspects, and advantages of the present invention will become apparent from the following description which refers to the accompanying drawings.

DETAILED DESCRIPTION OF THE INVENTION

Hereafter, a preferred embodiment of the present invention will be descried referring to the accompanying drawings.

Figure 1:
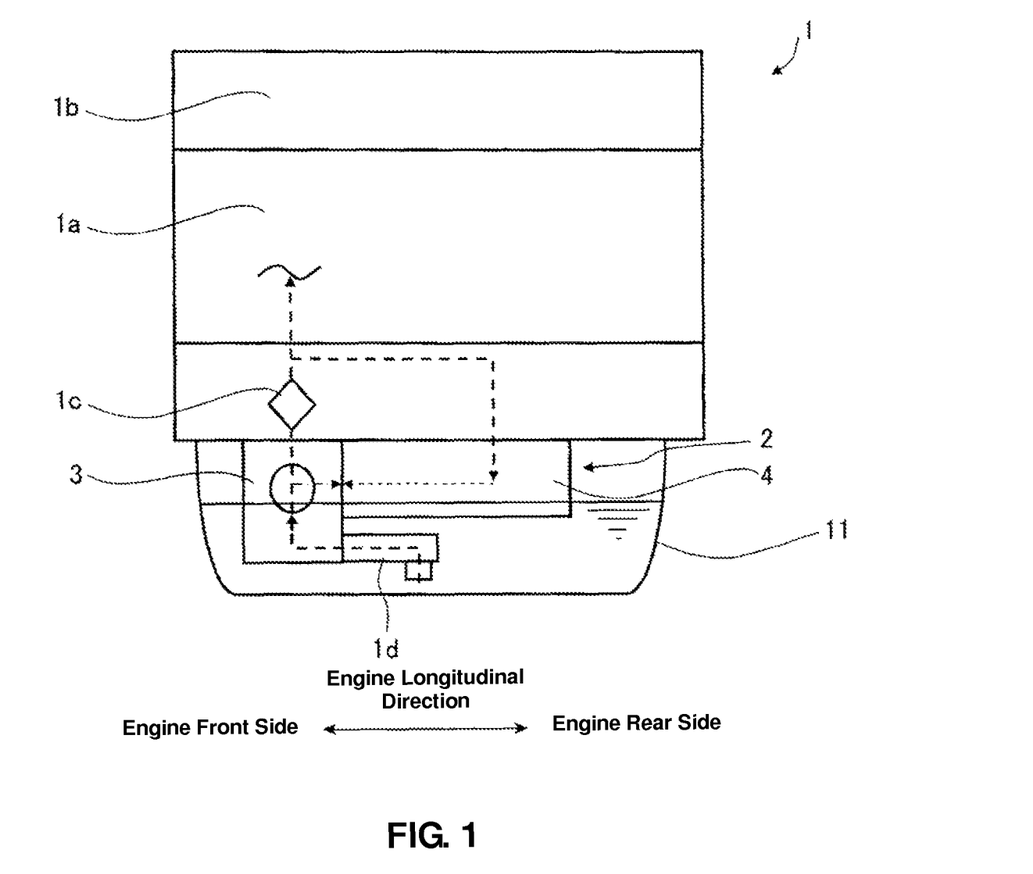
FIG. 1 is a schematic diagram of a balancer device and an engine equipped with the balancer device according to an embodiment of the present invention.

A balancer device 2 according to the embodiment of the present invention is installed in an engine 1. The engine 1, as shown in FIG. 1, comprises a cylinder block 1a which has cylinders, a cylinder head 1b which is attached to an upper face of the cylinder block 1a, and an oil pan 11 which is attached to a lower face of the cylinder block 1b. The oil pan 11 stores oil therein.

The balancer device 2 comprises an oil pump unit 3 and a balancer unit 4. The oil pump unit 3 and the balancer unit 4 are coupled to each other. The balancer device 2 as a coupling body of these units 3, 4 is stored inside the oil pan 11. The balancer device 2 is fastened to the lower face of the cylinder block 1b by bolts.

The coupling of the oil pump unit 3 to the balancer unit 4 provides a smaller-sized balancer device 2 compared with a separate arrangement of these units. According to the present embodiment, the length of the balancer device 2 in a direction of a crankshaft (not illustrated) of the engine 1, i.e., an engine longitudinal direction is made short. Hereafter, the engine longitudinal direction will be simply referred to as "longitudinal direction."

The oil pump unit 3 is driven by a rotation of the engine 1. In the present embodiment, the oil pump unit 3 is a trochoid type.

The balancer unit 4 is driven by a rotation of a pump shaft 30, which will be specifically described later, of the oil pump unit 3. To this balance unit 4 is supplied oil which is supplied from the oil pump unit 3 toward the cylinder block 1b and passes through an oil filter 1c. The balancer unit 4 is compulsorily lubricated by this oil.

An oil path is illustrated by broken lines in FIG. 1. The oil stored inside the oil pan 11 is sucked into the oil pump unit 3 after relatively large-sized dusts and the like are removed (trapped) by the oil strainer 1d. The oil pump unit 3 supplies the oil to the oil filter 1c with pressure. The oil filter 1c removes relatively small-sized dusts and the like contained in the oil. The oil having passed through the oil filter 1c flows into an oil passage formed in the cylinder block 1a. The oil passage in the cylinder block 1a connects to an oil passage formed in the balancer unit 4. Accordingly, the oil having passed through the oil filter 1c flows into the balancer unit 4 as well as the cylinder block 1a. Thus, the oil pump unit 3 supplies the oil into the balance unit 4 in addition to the cylinder block 1a with pressure.

The oil which has flowed into the balancer unit 4 and leaked from the oil pump unit 3 toward the balancer unit 4 flows down through a pair of connection grooves (connection portion) 51b which is formed at a coupling portion 5 of the units 3, 4, and then flows out to the outside of the units 3, 4.

Figure 2:
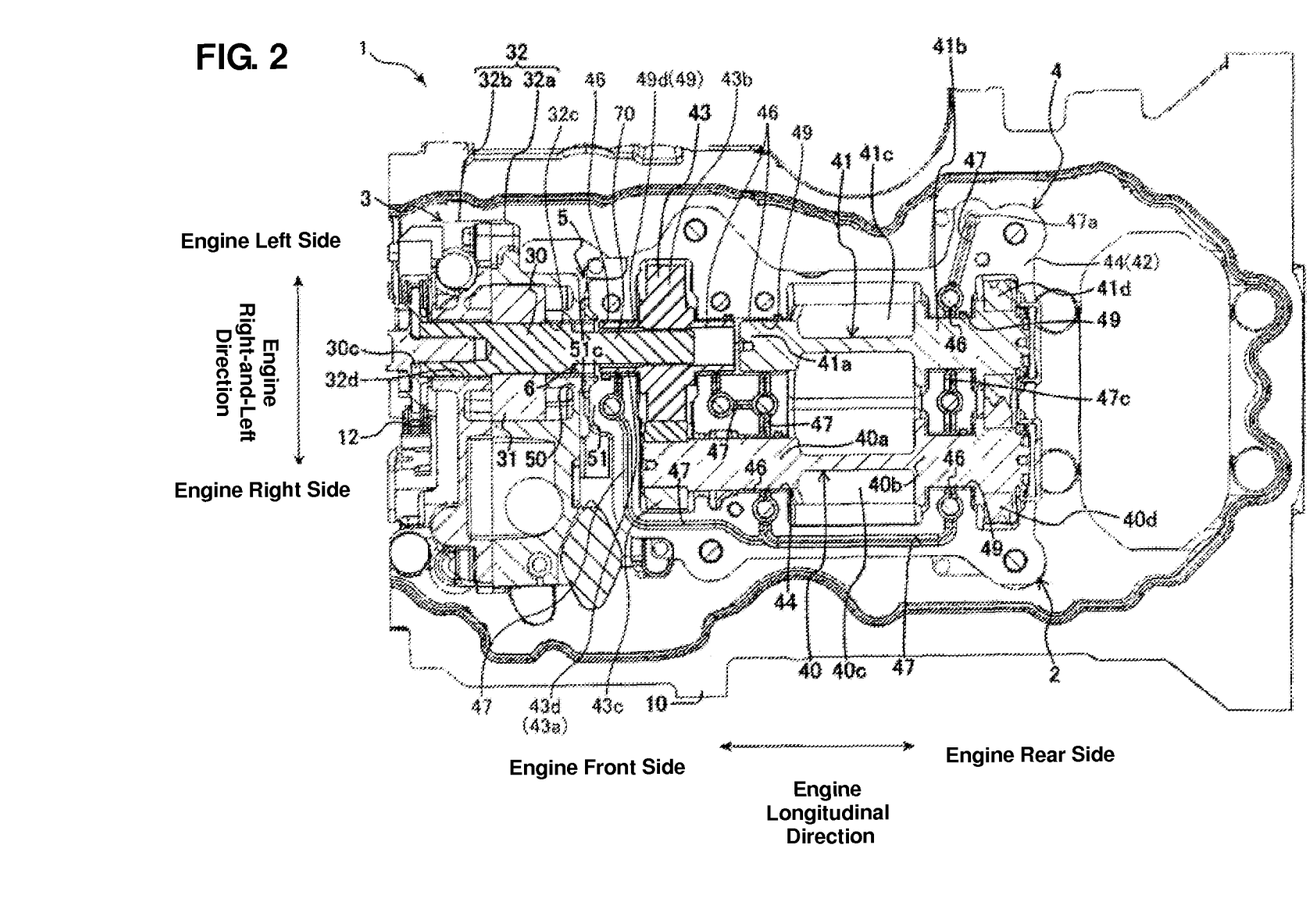
FIG. 2 is a sectional bottom view of the balancer device according to the embodiment of the present invention in a state in which a lower housing of the balancer device is removed, when viewed from the engine lower side.

As shown in FIG. 2, the oil pump unit 3 comprises a pump shaft 30, a pump rotor 31, and a pump housing 32 which stores the pump shaft 30 and the pump rotor 31.

The pump shaft 30 is a shaft extending in the longitudinal direction. A power transmission shaft 70 extends rearward from a rear end face of the pump shaft 30 coaxially with the pump shaft 30. In the present embodiment, the pump shaft 30 and the power transmission shaft 70 are formed integrally. That is, in case an entire shaft extending in the longitudinal direction is constituted of a pump shaft, a rear part of this pump shaft functions as the power transmission shaft 70, whereas a front part of this pump shaft functions as the pump shaft driven by the crankshaft. In the present embodiment, as shown in FIG. 2, the power transmission shaft 70 is part of the pump shaft extending rearward from a position slightly in front of the rear end face of the pump housing 32 and having a smaller diameter.

A sprocket 30c is attached to a front end portion of the pump shaft 30. A timing chain 12 extends around the sprocket 30c and another sprocket (not illustrated) attached to the crankshaft. The pump shaft 30 is driven by the crankshaft via the timing chain 12. The gear ratio of these sprockets is set at 1:1 so that the pump shaft 30 rotates at the same rotational speed as that of the crankshaft (i.e., the engine rotational speed). Thus, the rotational ratio of the pump shaft 30 and the crankshaft is set at an appropriate one.

The pump rotor 31 is driven by a rotation of the pump shaft 30. The pump rotor 31 comprises an inner rotor having an outer gear formed at its outer peripheral face and an outer rotor having an inner gear formed at its inner peripheral face. The inner gear of the outer rotor engages with the outer gear of the inner rotor. The inner rotor is inserted around a pump-shaft body 30a. The outer rotor is arranged around the inner rotor. The inner rotor is configured to rotate such that its rotational axis is offset from a rotational axis of the outer rotor and the pump shaft 30. This rotation of the inner rotor causes engaging of the outer gear of the inner rotor with the inner gear of the outer rotor, so that the oil in the oil pan 11 is sucked into an inlet port of the oil pump unit 3 through the oil strainer 1b. Then, the oil sucked into the inlet port is discharged to an outlet port of the oil pump unit 3 through a pump chamber (rotor chamber) of the oil pump unit 3. The oil discharged to the outlet port flows into the cylinder block 1b and the balancer unit 4 through the oil filter 1c and an oil cooler (not illustrated).

The pump housing 32 comprises a pump case 32a and a pump cover 32b which covers a front portion of the pump case 32a. The pump case 32a and the pump cover 32b are fastened to each other by bolts so that these two are formed integrally.

At a rear end portion of the pump case 32a is formed a circular rear journal hole 32c (a journal hole for pump shaft), which rotationally supports a rear end portion of the pump shaft 30 via a bearing. The rear journal hole 32c opens at a rear end face of the pump housing 32.

A circular front journal hole 32d, which rotationally supports a front end portion of the pump-shaft body 30a via a bearing, is formed at a front end portion of the pump cover 32b.

The power transmission shaft 70 penetrates the pump housing 32 from the inside of the above-described rear journal hole 32c and projects rearward, i.e., toward the balancer unit 4, from the pump housing 32. A rear portion of the power transmission shaft 70 is inserted into a balance housing 42, which will be described later, of the balancer unit 4. More specifically, the rear portion of the power transmission shaft 70 is inserted into a journal hole for gear shaft 49d, which will be described later, of the balancer housing 42. A spline portion 30d (see FIG. 3) is formed at an outer peripheral face of a rear end portion of the rear portion of the power transmission shaft 70 which is inserted into the balancer housing 42. The balancer unit 4 can restrain the vertical vibration caused by the secondary inertia force of the engine 1, and is coupled to a rear portion of the oil pump unit 3. The balancer unit 4 comprises a pair of balancer shafts 40, 41, a multiplying gear mechanism 43, and the balancer housing 42 which stores the both balancer shafts 40, 41 and the multiplying gear mechanism 43 therein. The multiplying gear mechanism 43 is stored inside a front portion of the balancer housing 42. The multiplying gear mechanism 43 transmits the rotation of the pump shaft 30 to the first balancer shaft 40 of the pair of balancer shafts 40, 41 with an increase of rotational speed. In the present embodiment, the multiplying gear mechanism 43 transmits the rotation of the pump shaft 30 to the first balancer shaft 40 on the engine right side of the pair of balancer shafts 40, 41.

Figure 3:
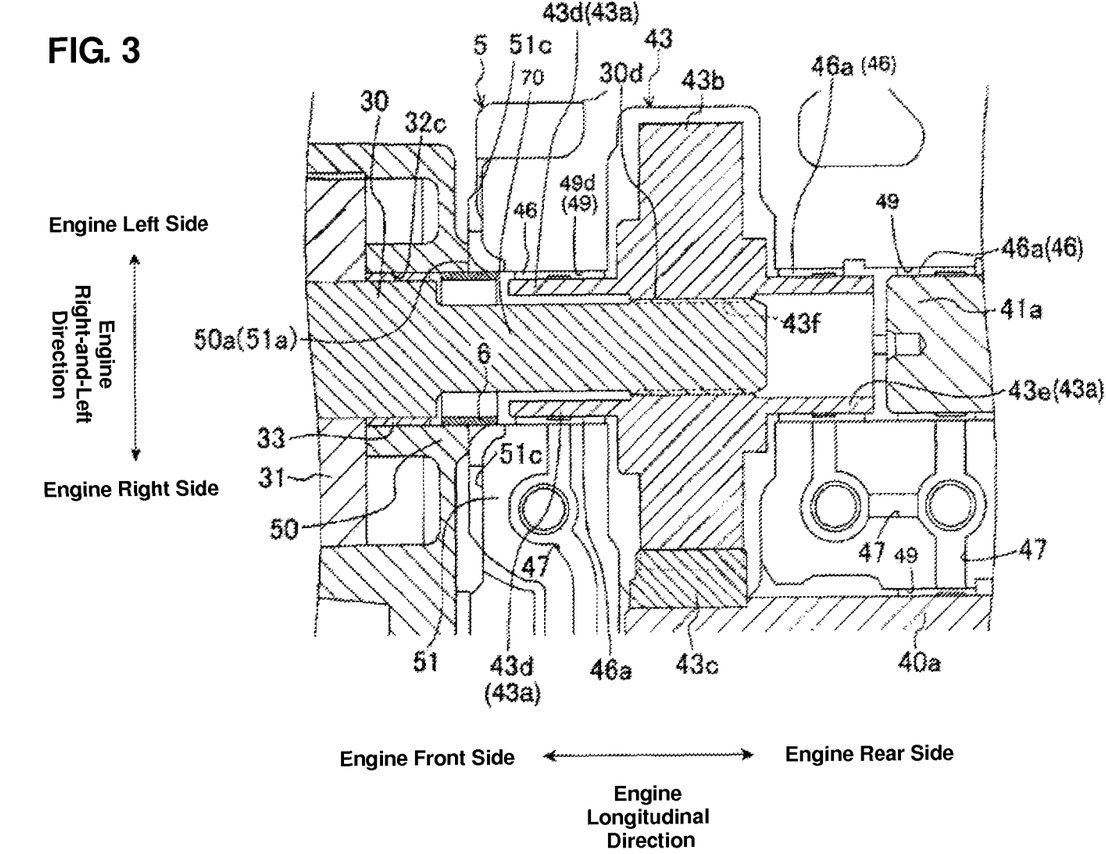
FIG. 3 is an enlarged view of a major portion of FIG. 2.

The above-described multiplying gear mechanism 43, as shown in FIG. 3 and others, comprises a cylindrical gear shaft 43a, a first gear 43b which is formed at an outer peripheral face of a central portion of the gear shaft 43a, and a second gear 43c which is arranged around an engine-front-side end portion of the first balancer shaft 40 and engages with the first gear 43b.

The gear shaft 43a includes a front journal portion 43d and a rear journal portion 43e. A spline portion 43f is formed at an inner peripheral face of the central portion of the gear shaft 43a. This spline portion 43f engages with a spline portion 30d which is formed at a rear end portion of the power transmission shaft 70, and the gear shaft 43a rotates together with the pump shaft 30 via the power transmission shaft 70. That is, the gear shaft 43 engages with the rear portion of the power transmission shaft 70 which is inserted into the balancer housing 42, and is driven by a rotation of the power transmission shaft 70. The rotation of the gear shaft 43a is transmitted to the first balancer shaft 40 via the first gear 43b and the second gear 32c. The balancer shafts 40, 41 extend in the longitudinal direction and are arranged side by side in the engine right-and-left direction. Hereafter, the engine right-and-left direction will be simply referred to as "right-and-left direction."

A rotation of the pump-shaft body 30a is transmitted to the first balancer shaft 40 via the above-described multiplying gear mechanism 43. The first balancer shaft 40 includes a front journal portion 40a, a weight portion 40c, and a rear journal portion 40b.

The second balancer shaft 41 on the left side of the pair of balancer shafts 40, 41 is driven by a rotation of the first balancer shaft 40, and includes a front journal portion 41a, a weight portion 41c, and a rear journal portion 41b.

A pair of co-moving gears 40d, 41d is attached around respective rear end portions of these balancer shafts 40, 41. These gears 40d, 41d engage with each other. In the present embodiment, these gears 40d, 41d are a helical gear. The gear ratio of the co-moving gears 40d, 41d is set at 1:1 so that the both balancer shafts 40, 41 rotate at the same rotational speed.

Figure 7:
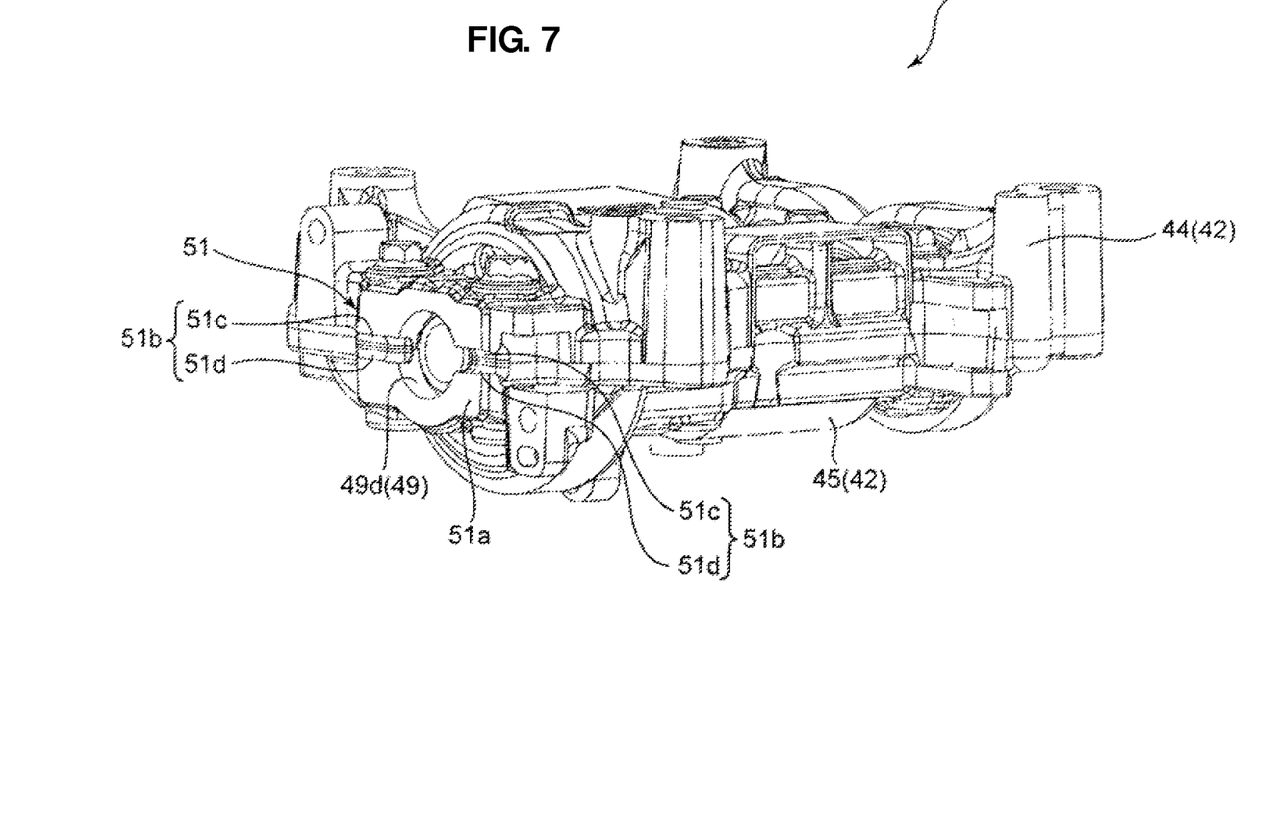
FIG. 7 is a schematic perspective view of a balancer unit.
Figure 8:
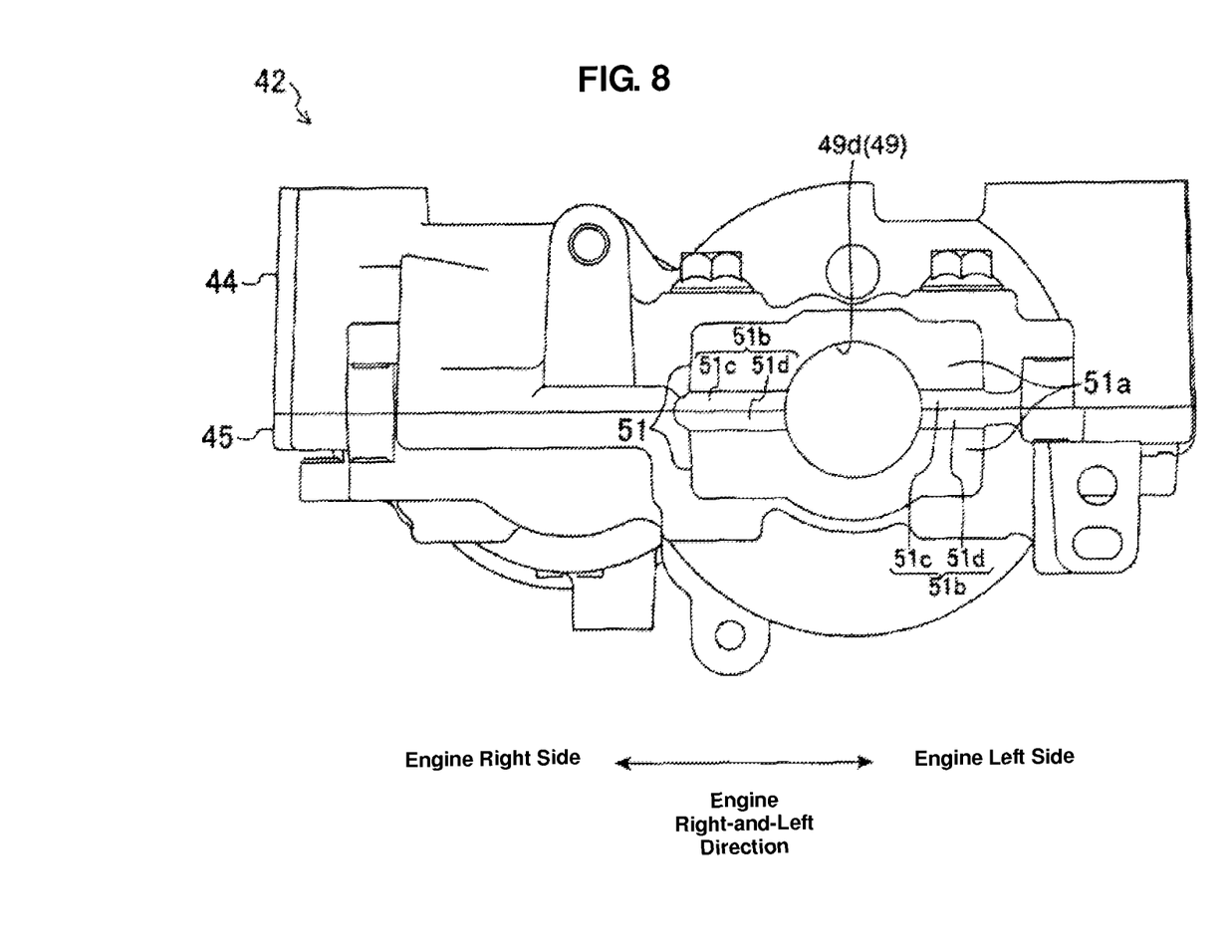
FIG. 8 is an elevational view of the balancer housing, when viewed from the engine front side.

The balancer housing 42 is an article of casting, which comprises an upper-half split housing 44 and a lower-half split housing 45 as shown in FIGS. 7 and 8. The upper housing 44 and the lower housing 45 are fastened to each other by bolts as a unit.

At the balancer housing 42, as shown in FIG. 2, are formed plural cylindrical journal holes 49 to rotationally support the balancer shafts 40, 41 and the gear shaft 43a of the multiplying gear mechanism 43. Specifically, grooves having a half-circular section are formed at the upper housing 44 and the lower housing 45. These grooves form the above-described journal holes 49 when the both housings 44, 45 are coupled to each other.

The journal hole 49d, one of the journal holes 49, opens at a front end face of the balancer housing 42. Hereafter, this journal hole 49d will be referred to as "journal hole for gear shaft 49d." The rear end portion of the power transmission shaft 70 is inserted into the journal hole for gear shaft 49d as described above, and the front journal portion 43d of the gear shaft 43a is inserted into the journal hole for gear shaft 49d to rotationally support the front journal portion 43d.

The journal holes 49 rotationally supporting the second balancer shaft 41 and the gear shaft 43a have the same diameter, respectively. In the present embodiment, the plural journal holes 49 are formed through a single hole-forming process in a state in which the upper housing 44 and the lower housing 45 are coupled to each other. This process can provide a coaxial arrangement of the second balancer shaft 41 and the gear shaft 43a which are rotationally supported at the journal holes 49. The hole diameter of the journal hole 49 rotationally supporting the first balancer shaft 40 and the gear shaft 43a is set to be equal to that of the rear journal hole 32c formed at the rear end portion of the pump case 32a.

The balancer shafts 40, 41 and the gear shaft 43a are rotationally supported at the journal holes 49 via cylindrical bearings 46 as shown in FIG. 3 and others. That is, the bearings 46 are inserted into the respective journal holes 49, and the balancer shafts 40, 41 are inserted into the bearings 46.

In the present embodiment, each of the cylindrical bearings 46 is comprised of a pair of half-split members 46a (hereafter, this member will be referred to as "metal"), and the pair of half-split metals 46a form a cylindrical member when being combined. Hereafter, the bearing 46 will be referred to as the "half-split type of bearing 46."

Figure 4:
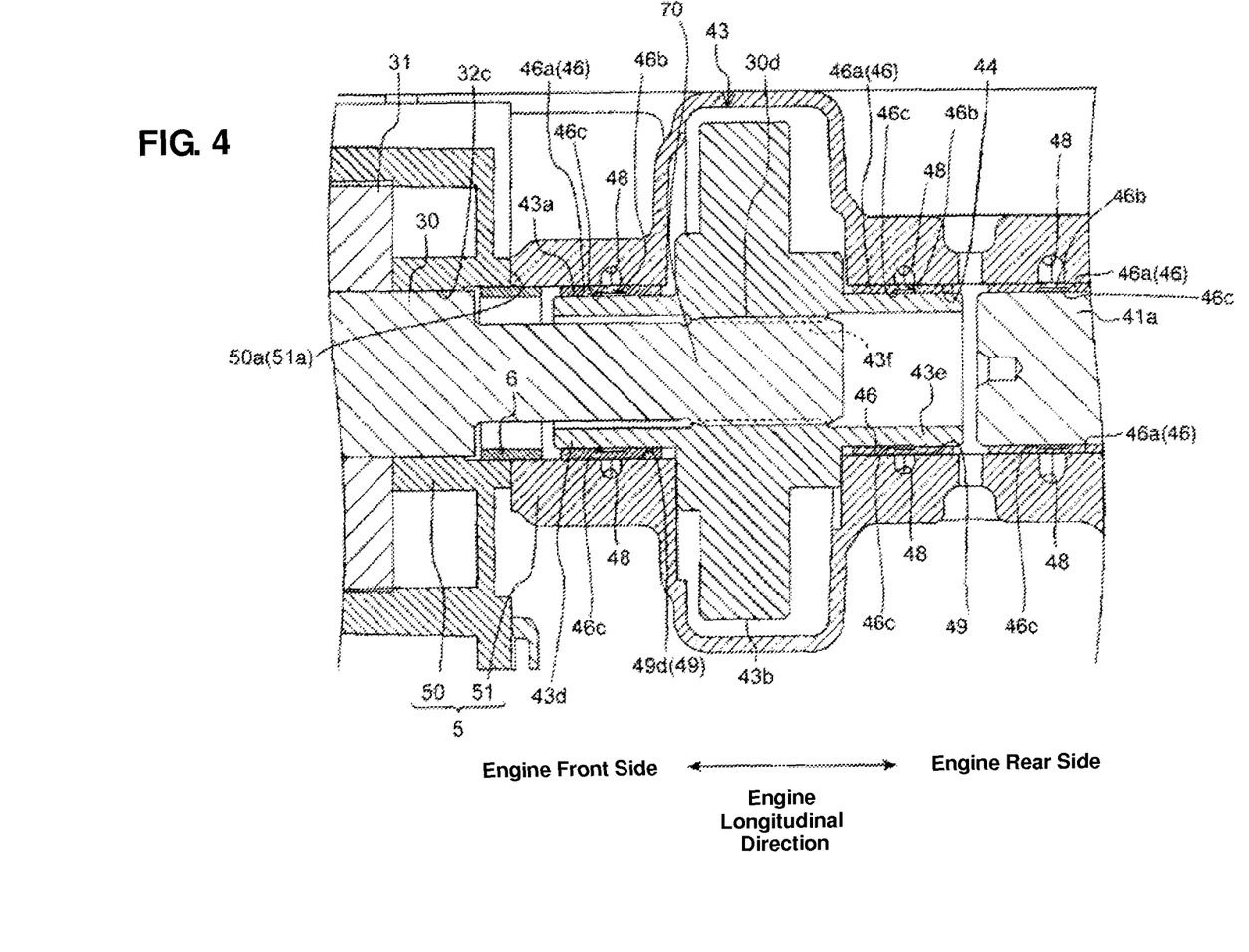
FIG. 4 is an enlarged vertical sectional view of part of the balance shaft along a shaft-line of the balancer device.
Figure 5:
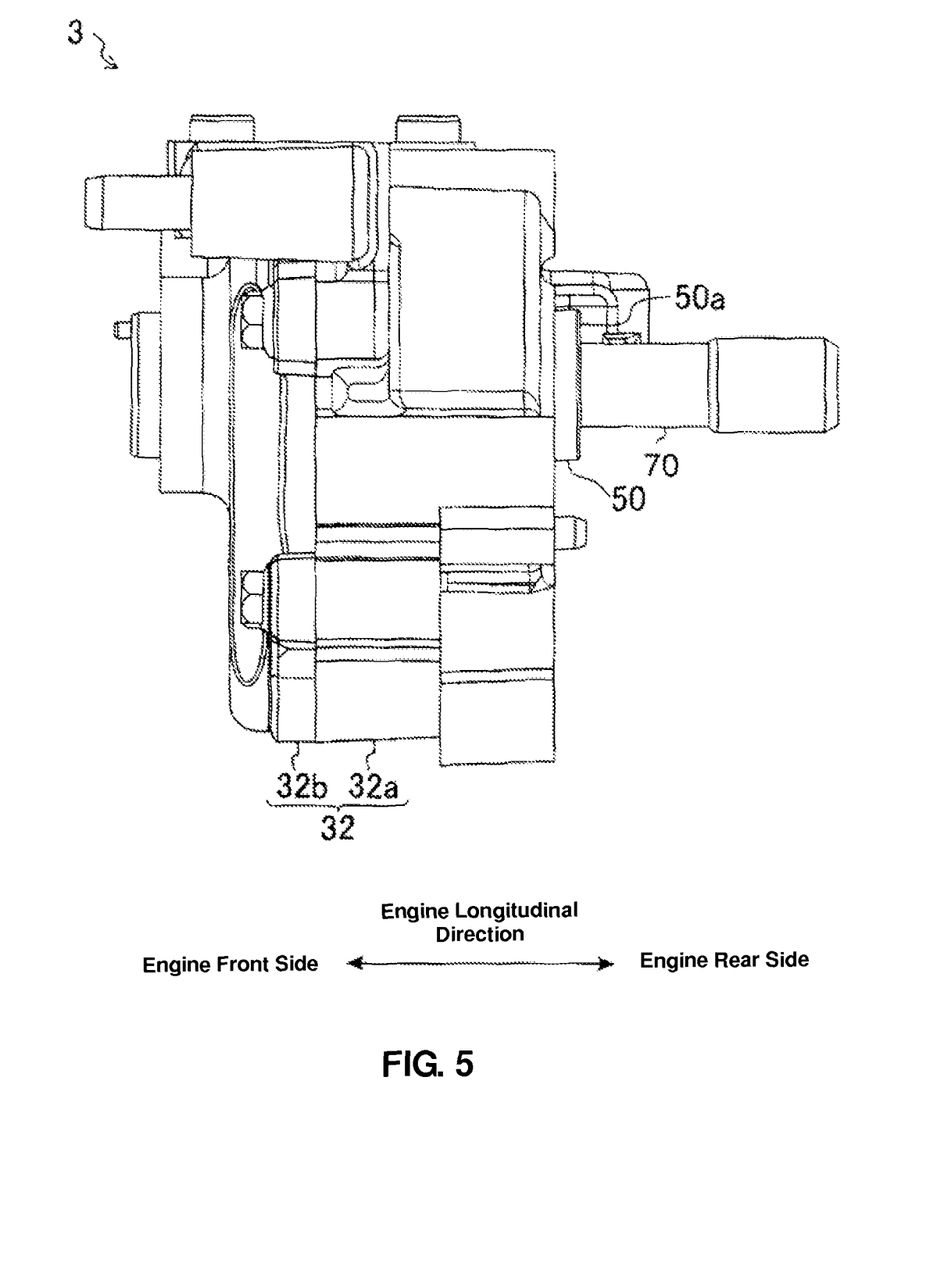
FIG. 5 is a side view of an oil pump unit, when viewed from the engine left side.
Figure 6:
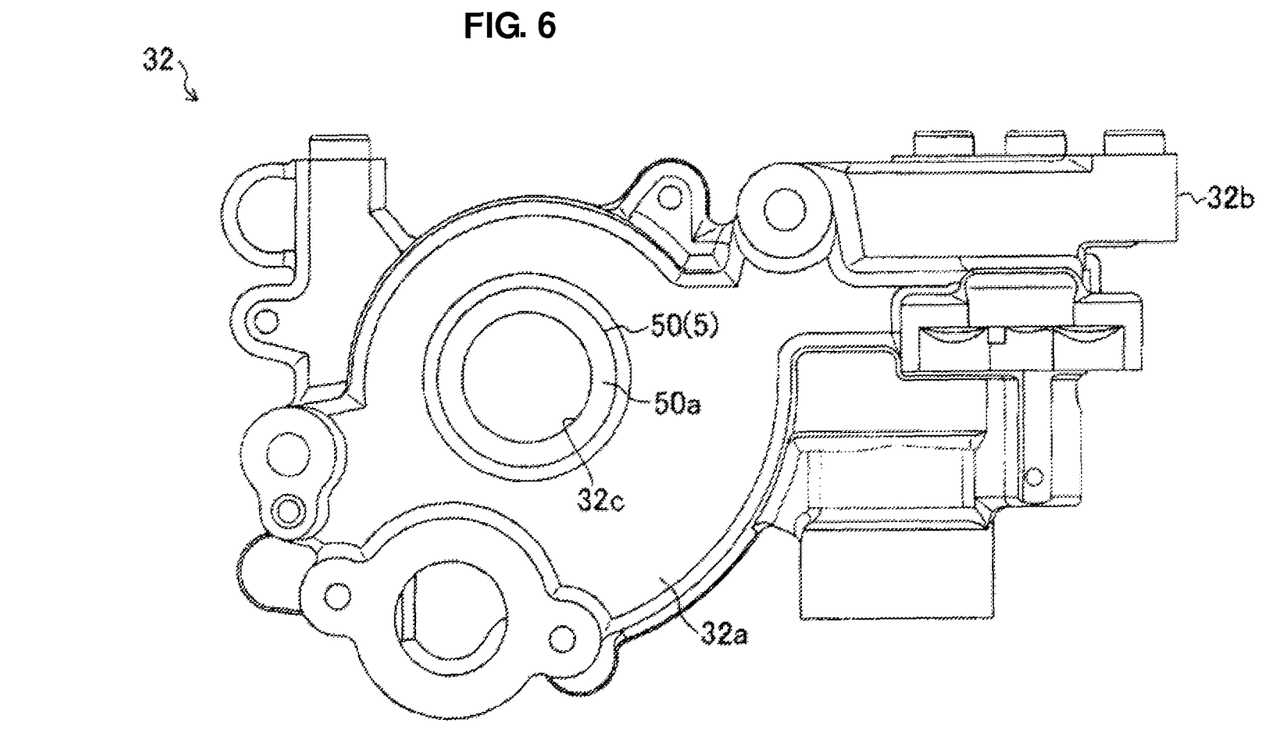
FIG. 6 is a back view of a pump housing, when viewed from the engine rear side.

As shown in FIG. 4, an oil hole 46b is formed at least at one of the pair of metals 46a so that the outside and the inside of the metal 46a are connected thereby. Further, an oil groove 46c is formed at an inner peripheral face of each half-split type of bearing 46 over an entire area in its peripheral direction. The oil hole 46b and the oil groove 46c are connected to each other.

A compulsory lubrication structure for the balancer unit 4 will be described specifically.

Grooves for lubricating oil 48, as shown in FIG. 4, are formed at respective inner peripheral faces of the journal holes 49 formed at the balancer housing 42 over an entire area in its peripheral direction. The groove for lubricating oil 48 connects to the oil groove 46c of the half-split type of bearings 46 inserted into the journal hole 49 via the oil hole 46b of the half-split type of bearing 46.

At the balancer housing 42, as shown in FIGS. 2 and 3, are formed balancer-side oil passages 47 which extend over the journal holes 49 and connect to the respective grooves for lubricating oil 48 of the journal holes 49.

A rear end portion 47a of the balancer-side oil passage 47 connects to the oil passage inside the cylinder block 1b. Accordingly, the oil which has been supplied from the oil pump unit 3 with pressure and passed through the oil strainer 1b flows into the balancer-side oil passages 47. Then, this oil flows in the grooves for lubricating-oil 48 of the journal holes 49 from the balancer-side oil passages 47, and is supplied to a space between the outer peripheral faces of the balancer shafts 40, 41 and the gear shaft 43a and the inner peripheral face of the half-split type of bearings 46, passing through the oil holes 46b and the oil grooves 46c of the half-split type of bearings 46. Thus, the oil, dusts and the like of which have been removed by the oil filter 1c, is supplied to the space between the outer peripheral faces of the balancer shafts 40, 41 and the gear shaft 43a and the inner peripheral faces of the half-split type of bearings 46 from the side of the outer periphery of the half-split type of bearings 46. Accordingly, the balancer unit 4 is compulsorily lubricated by the oil having passed through the oil filter 1c. As described above, according to the present embodiment, the above-described balancer-side oil passage 47 and the oil holes 46b function as the oil supply passage to supply the oil to the space between the half-split type of bearings 46 and the gear shaft 43a and the balancer shafts 40, 41 from the side of the outer periphery of the half-split type of bearings 46.

The above-described journal hole for gear shaft 49d, which is located on the front side of the journal holes 49 of the journal holes 49 of the balancer housing 42 having the above-described grooves for lubricating-oil 48, connects to the pair of connection grooves 51b, which will be described specifically later. The pair of connection grooves 51b extend from the journal hole for gear shaft 49d to both ends of the balancer housing 42, and thereby connect to the outside of the balancer housing 42. Accordingly, the oil which has supplied to the balancer unit 4 after passing through the oil filter 1c flows down through the journal holes 49 and the inside of the balancer-side oil passages 47, and then flows into this journal hole for gear shaft 49d. And, the oil flows through the connection grooves 51b, and finally flows out to the outside of the balancer housing 42.

Thus, the oil supplied into the balancer housing 4 is discharged to the outside of the balancer unit 42, i.e., toward the oil pan 11, without improperly staying inside the balancer housing 42. Accordingly, it can be restrained that the oil is compressed and heated inside the balancer housing 42. Thereby, the half-split type of bearings 46, i.e., the balancer shafts 40, 41 and the gear shaft 43 can be properly restrained from being damaged by the oil with high temperature.

Next, the coupling structure of the oil pump unit 3 to the balancer unit 4 will be described specifically.

As shown in FIG. 3 and others, the pump housing 32 and the balancer housing 42 are coupled to each other in the vicinity of the power transmission shaft 70 which extends over these housings. Specifically, a peripheral edge portion 50 of the rear journal hole 32c located at the rear end portion of the pump case 32a (hereafter, this peripheral edge portion will be referred to as "pump-side coupling portion 50") and a peripheral edge portion 51 of the journal hole for gear shaft 49d located at the front end portion of the upper housing 44 of the balancer housing 42 (hereafter, this peripheral edge portion will be referred to as "balancer-side coupling portion 51") are coupled to each other. That is, the coupling portion 5 of the pump housing 32 and the balancer housing 42 is comprised of the pump-side coupling portion 50 and the balancer-side coupling portion 51. A portion 50a (pump-side coupling face) which is part of an outer surface of the pump-side coupling face 50 and part of a rear end face of the pump housing 32 contacts a portion 51a (balancer-side coupling face) which is part of an outer surface of the balancer-side coupling face 51 and part of a front end face of the balancer housing 42.

A positioning pin 6 is inserted into the rear journal hole 32c of the pump housing 32 and the journal hole for gear shaft 49d of the balancer housing 42, extending over these journal holes 32c, 49d. This positioning pin 6 is of a cylindrical shape.

A half part of the positioning pin 6 is inserted into the rear journal hole 32c of the pump housing 32 with pressure, and the other half part of the positioning pin 6 is coupled into the journal hole for gear shaft 49d of the balancer housing 42. This insertion of the positioning pin 6 into these rear journal holes 32c, 49d can provide the coaxial arrangement of the both journal holes 32c, 49d, i.e., the pump shaft 30 and the gear shaft 43a.

As shown in FIGS. 3, 7 and 8, at the above-described coupling face 51a are formed the connection grooves 51b which open at the inner peripheral face of the journal hole for gear shaft 49d and connect the journal hole for gear shaft 49d of the balancer housing 42 as an inside space of the coupling portion 5 to an outside space of the coupling portion 5.

That is, at the coupling face 51a of the balancer housing 42 are formed the connection grooves 51b which open at the journal hole for gear shaft 49d of the balancer housing 42 and connect to the journal hole for gear shaft 49d and thereby connect the inside to the outside of the coupling portion 5.

The connection grooves 51b extend toward the both sides in the engine right-and-left direction from the journal hole for gear shaft 49d of the balancer housing 42, and open at the both-side end faces, in the engine right-and-left direction, of the balancer-side coupling portion 51.

Each of the pair of connection grooves 51b comprises a pair of grooves which is formed to extend along a split-coupling face of the upper and lower housings 44, 45 of the balancer housing 42. Specifically, each connection groove 51b comprises an upper groove 51c which is formed at the upper housing 44 and opens downward, and a lower groove 51d which is formed at the lower housing 45 and opens upward. A pair of upper and lower grooves 51c, 51d forms each of the connection grooves 51b together by coupling the upper and lower housings 44, 45.

When the oil pump unit 3 and the balancer unit 4 are coupled to each other so that the respective coupling faces 50a, 51a contact each other, the pair of connection grooves 51b form a pair of through holes which penetrates the coupling portion 5 in the right-and-left direction together with the coupling face 50a of the oil pump unit 3.

The connection groove 51b is formed so that a rear-side portion of its opening end at the inner peripheral face of the journal hole for gear shaft 49d is located rearward from the positioning pin 6 in a state in which the positioning pin 6 is inserted into the journal hole for gear shaft 49d of the balancer housing 42. Accordingly, even in a state in which the positioning pin 6 is inserted, the inside of the journal hole for gear shaft 49d of the balancer housing 42 and the outsides of the balancer housing 42 and the oil housing 30 are connected to each other.

Herein, the pump housing 32 and the balancer housing 42 are coupled to each other at other positions than the above-described coupling portion 5 as well.

At the coupling portion 5 constituted as above, the oil is restrained from flowing from the side of the oil pump housing 32 to the side of balancer housing 42, so that it can be restrained that the gear shaft 43a and the balancer shafts 40, 41 inside the balancer housing 42 are damaged by the dusts and the like contained in the oil.

Specifically, when the oil pump unit 3 is driven, the oil is pressurized by the pump unit 3. Herein, part of the pressurized oil leaks from the space between the pump rotor 31 and the pump housing 32. Since the pump housing 32 and the balancer unit 42 are coupled to each other at the outer periphery of the pump shaft 30 as described above, the high-pressure leaking oil directly flows into the journal hole for gear shaft 49 of the balancer housing 42, through the rear journal hole 32c of the pump housing 32. The high-pressure oil does not flow down through any oil filter, so it may contain dusts and the like in it. Therefore, there is a concern that when the oil flows into the balancer housing 42, the dusts and the like contained in the oil may deteriorate the reliability of the journal portions 40a, 40b, 41a, 41b of the balancer shafts 40, 41, the multiplying gear mechanism 43 and the like.

However, according to the balancer device 2 of the present embodiment, the connection grooves 51b connecting the inside to the outside of the coupling portion 5 are formed at the coupling face 51a on the side of the balancer housing 42. Accordingly, the high-pressure oil containing dusts and the like from the oil pump unit 3 flows into the balancer-side coupling portion 51, and then flows out to the outside of the balance housing 42 through the connection grooves 51b. Thus, it can be restrained that the high-pressure oil containing dusts and the like from the oil pump unit 3 flows into the journal portions of the balancer shaft 40 which are located rearward from the connection grooves 51b. Accordingly, it can be restrained that dusts and the like contained in the oil deteriorates the reliability of the journal portions 40a, 40b, 41a, 41b of the balancer shafts 40, 41, the multiplying gear mechanism 43 and the like. Thus, the above-described connection grooves 51b function as a high-pressure oil releasing groove.

As described above, according to the balancer device 2 of the present embodiment, since the pump housing 32 and the balancer housing 42 are coupled to each other, the whole unit of the balancer device 2 can be made small sized. Further, since the connection grooves 51b are formed at the coupling portion 5, the high-pressure oil containing dusts and the like from the oil pump unit 3 can be restrained from flowing into the journal portions of the balancer shaft 40 and the like. Thus, the size of the balancer device 2 can be properly small as well as the reliability of the balancer device 2 can be secured.

Further, according to the present embodiment, the oil which has passed through the oil filter 1c via the balancer-side oil passage 47 and the like is supplied to the journal hole for gear shaft 49d of the balancer housing 42 connecting to the connection grooves 51b. Accordingly, the gear shaft 43a can be lubricated by this oil. Moreover, since the oil after lubricating is discharged to the outside of the balancer housing 42 through the connection grooves 51b, it can be restrained that the oil stays inside the balancer housing 42 and thereby is heated improperly. Thereby, the reliability of the gear shaft 43a and the like can be further improved.

Also, since the connection grooves 51b as the connection portion is formed at the coupling face 51a on the side of the balancer housing 42 of the two coupling faces 50a, 51a of the coupling portion 5 in the vicinity of the outer periphery of the pump shaft 30, the connection grooves 51b can be formed easily.

Moreover, since the connection grooves 51b are formed at the coupling face 51a on the side of the balancer housing 42 of the two coupling faces 50a, 51a to extend along the split-coupling face of the upper housing 44 and the lower housing 45, the connection grooves 51b can be formed easily with lower costs.

Also, since the connection groove 51b is formed so that the rear-side portion of the opening end thereof at the inner peripheral face of the journal hole for gear shaft 49d is located rearward from the positioning pin 6, the oil flowing out to the outside of the balancer housing 42 may not be obstructed by the positioning pin 6. Thus, it can be restrained that the dusts and the like contained in the high-pressure oil from the oil pump unit 3 deteriorates the reliability of the journal portions 40a, 40b, 41a, 41b of the balancer shafts 40, 41 of the balancer unit 4, the multiplying gear mechanism 43 and the like, and the coaxial arrangement of the pump shaft 30 and the gear shaft 43a can be provided.

The present invention should not be limited to the above-described embodiment, and any other modifications and improvements may be applied within the scope of a sprit of the present invention.

For example, while the oil pump unit 3 of the present embodiment is the trochoid type, it may be an inner-contacting gear type as well.

Further, while the connection grooves 51b are formed at the coupling face 51a on the side of the balancer housing 42 in the present embodiment, they may be formed at the coupling face 50a on the side of the pump housing 32 (i.e., the coupling face 50a of the pump-side coupling portion 50 to the balancer-side coupling portion 51), or on both the coupling faces 50a, 51a.

Herein, if the connection grooves 51b are formed at the coupling face 51a on the side of the balancer housing 42 and the connection grooves 51b and the journal hole for gear shaft 49d are connected to each other, the high-pressure lubricating oil supplied to the journal hole for gear shaft 49d through the oil filter 1c can be discharged to the outside of the balancer housing 42 through the connection grooves 51b. Accordingly, in case the lubricating oil is supplied to the journal hole for gear shaft 49d, it may be preferable that the connection grooves 51b be formed at the coupling face 51a on the side of the balancer housing 42.

Further, while the connection grooves 51b as the connection portion are formed at the coupling face 51a on the side of the balancer housing 42 in the present embodiment, a connection hole which connects the inside and the outside of the coupling portion 5 may be formed at an inner portion of at least one of the pump-side coupling portion 50 and the balancer-side coupling portion 51.

Also, while the connection groove 51*b* of the present embodiment is formed so that the rear-side portion of the opening end thereof at the inner peripheral face of the journal hole for gear shaft 49*d* is located rearward from the positioning pin 6, it may be formed so that an entire portion of the opening end thereof is located rearward from the positioning pin 6 (on the outside of the positioning pin 6 in its axial direction).

Moreover, while the two connection grooves 51*b* are formed in the present embodiment, the number of the grooves should not be limited to the two and more number of grooves may be preferable to restrain the flowing of the high-pressure oil into the balance housing 42.

Further, while the gear shaft 43*a* and the balancer shafts 40, 41 are supported via the bearing 46 comprising two half-split plate metals 46*a* in the present embodiment, the type of bearing should not be limited to this.

Also, while an example in which the pump shaft 30 and the power transmission shaft 70 are integral with each other has been explained in the present embodiment, these shafts 30, 70 may be configured to be separate from each other.

What is claimed is:

1. A balancer device of an engine, comprising:
   an oil pump unit including a pump shaft driven by a rotation of the engine, a rotor driven by the pump shaft to increase a pressure of oil, and a pump housing storing the rotor therein;
   a balancer unit including an input gear, a pair of balancer shafts driven by the input gear, and a balancer housing storing the input gear and the balancer shafts therein; and
   a power transmission shaft rotationally coupled the pump shaft of the oil pump unit to the input gear of the balancer unit so as to transmit a drive force of the oil pump shaft to the input gear,
   wherein the pump housing of said oil pump unit and the balancer housing of said balancer unit are formed separately from each other, the pump housing has a journal hole at one end thereof which rotationally supports an end portion of the pump shaft via a bearing, the balancer housing has a journal hole at one end thereof which rotationally supports an end portion of the input gear via a bearing, said oil pump unit and said balancer unit are coupled to each other through a face contact such that an end face of said one end of the pump housing contacts an end face of said one end of the balancer housing and stored inside an oil pan of the engine, a cylindrical positioning member is inserted into the journal hole of the pump housing and the journal hole of the balancer housing for providing coaxial arrangement of the pump shaft and the input gear, and at least one of said one end of the pump housing and said one end of the balancer housing has at least one connection portion, the connection portion being configured to extend so as to connect a space inside said cylindrical positioning member inserted into the journal holes of the pump and balancer housings to an outside space of the balancer housing of the balancer unit.

2. The balancer device of an engine of claim 1, wherein said connection portion comprises a connection groove which is formed at least at one of said end face of the one end of the pump housing and said end face of the one end of the balancer housing.

3. The balancer device of an engine of claim 2, wherein said balancer housing comprises an upper housing and a lower housing which are coupled to each other, which are half-split articles of casting, and said connection groove is formed at said end face of the one end of the balancer housing to extend along a split-coupling face of the upper housing and the lower housing.

4. The balancer device of an engine of claim 3, wherein the input gear of said balancer unit is a multiplying gear mechanism which transmits a rotation of the pump shaft to one of the pair of balancer shafts with an increase of rotational speed and includes a gear shaft which is rotationally supported through said journal hole of the balancer housing and said connection groove is formed such that the connection groove opens at an inner peripheral face of at least one of the journal hole of the pump housing and the journal hole of the balancer housing and at least part of an opening end thereof at said inner peripheral face is located on an outside of said cylindrical positioning member in an axial direction.

5. The balancer device of an engine of claim 4, wherein said connection groove opens at the inner peripheral face of the journal hole of the balancer housing, said gear shaft of the input gear is rotationally supported at the journal hole of the balancer housing via the bearing inserted into the journal hole of the balancer housing, and an oil supply passage to supply the oil from an outer peripheral side of said bearing to a space between the bearing and the gear shaft is formed at the balancer housing.

6. The balancer device of an engine of claim 1, wherein the input gear of said balancer unit is a multiplying gear mechanism which transmits a rotation of the pump shaft to one of the pair of balancer shafts with an increase of rotational speed and includes a gear shaft which is rotationally supported at said journal hole of the balancer housing and said connection portion is formed such that the connection portion opens at an inner peripheral face of at least one of the journal hole of the pump housing and the journal hole of the balancer housing and at least part of an opening end thereof at said inner peripheral face is located on an outside of said cylindrical positioning member in an axial direction.

7. The balancer device of an engine of claim 6, wherein said connection portion opens at the inner peripheral face of the journal hole of the balancer housing, said gear shaft of the input gear is rotationally supported at the journal hole of the balancer housing via the bearing inserted into the journal hole of the balancer housing, and an oil supply passage to supply the oil from an outer peripheral side of said bearing to a space between the bearing and the gear shaft is formed at the balancer housing.

* * * * *